Aug. 13, 1940.    M. R. COWELL    2,211,457
STARTING APPARATUS FOR RACING
Filed Feb. 15, 1939    2 Sheets-Sheet 2
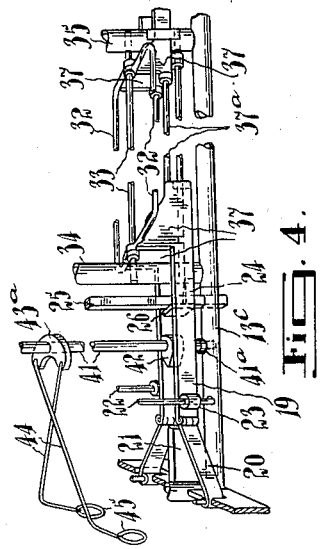
Inventor
M. R. Cowell Patented Aug. 13, 1940

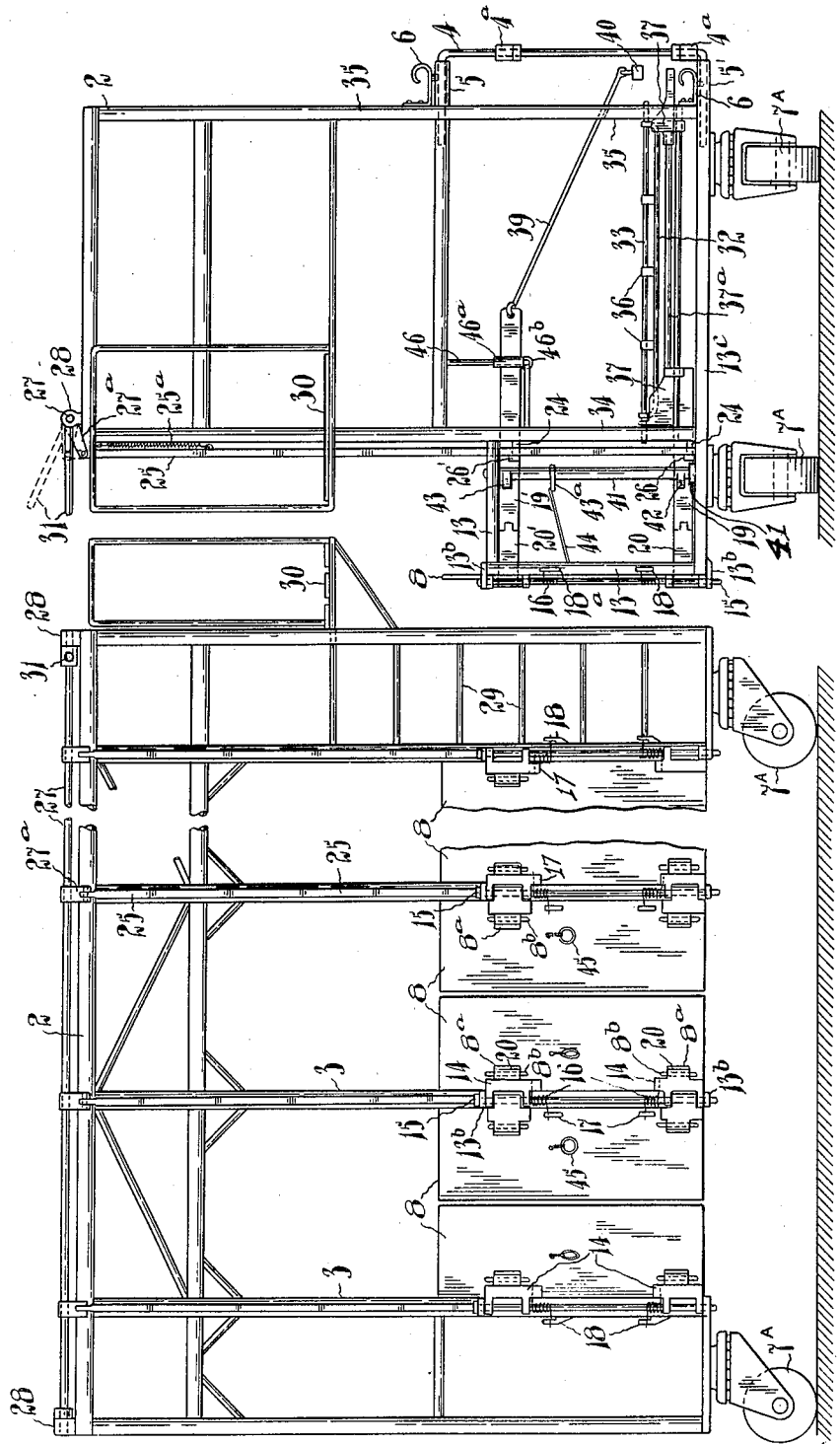

2,211,457

UNITED STATES PATENT OFFICE 2,211,457

STARTING APPARATUS FOR RACING

Marcus Ray Cowell, Toronto, Ontario, Canada

Application February 15, 1939, Serial No. 256,435

20 Claims. (Cl. 119—15.5)

This invention relates to starting apparatus for racing, particularly horse racing.

A great deal of difficulty has been encountered in racing in starting the animals simultaneously. In horse racing it has been particularly difficult. Various kinds of starting gates have been devised, but none has proved entirely satisfactory.

The object of the present invention is to devise starting apparatus into which the racing animals may be readily introduced; which is provided with means for properly positioning the animals therein; which is provided with means for simultaneously opening each stall to permit the animals to simultaneously leave the starting apparatus at the commencement of the race; and in which the parts are so constructed and arranged that the animals will have a clear passage and an unobstructed space to permit them to leave the stalls without any interference from the positioning apparatus or from other animals engaged in the race. Further objects are the provision of supporting means for the doors or gates of the stalls, and the provision of means for engaging the rear of each animal when the doors are opened which, preferably in combination with a bell, indicates to the animal that the doors are opened and the race has commenced. Other objects of the invention will hereinafter appear.

These objects are obtained by the provision of a door or doors at the front end of each stall, which doors are provided with rearwardly extending bars for supporting the doors, said bars having associated therewith latches for retaining the doors in closed position and means for simultaneously releasing said latches. Also provided are longitudinal guards on each side of each stall for positioning the animal in the centre of the stall, and means for simultaneously dropping the guards when the doors are opened and for raising the guards when the doors are closed, and a breeching strap extending across the rear of each stall, which breeching strap is adapted to be pulled forward when the doors are open. Other features of the invention will be hereinafter more particularly described and claimed.

One embodiment of the invention is shown in the accompanying drawings in which

Fig. 1 is a front elevation of the starting apparatus;

Fig. 2 an end elevation;

Fig. 3 a plan view;

Fig. 4 a perspective detail on an enlarged scale of the door latch and guard raising parts of the device;

Fig. 5 a rear elevation of the rear door of one of the stalls; and

Fig. 6 a perspective detail on an enlarged scale of part of the latch.

In the drawings like numerals of reference indicate corresponding parts in the different figures.

Since this device is particularly adapted for use with horses, it will hereinafter be described in connection with horse racing.

The frame is preferably composed of metal beams, bars, and tubes and consists of an overhead framework generally indicated by the numeral 2 from which extends a framework 3 which forms partitions dividing the apparatus into a plurality of stalls extending transversely of the length of the device. Although three stalls are shown, in practice as many as twelve will be used. The overhead framework 2 is sufficiently high for the horse and rider to pass beneath it and the partitions 3 are sufficiently spaced to provide room for the horse to stand in the stall. The length of each stall is sufficient to accommodate the horse.

As will be seen by Fig. 2 the rear of each stall is formed by U-shaped rods 4, the ends of which telescope within tubes 5 and 5'. The rods 4 may be pulled in or out to shorten or lengthen the stall and a releasable locking device 6 comprising a pin and a resilient metal strip is secured to the rear upright member 35 of the frame and is adapted to engage holes in the rod 4 to retain it in its extended or retracted position as desired. It will be noted that the frame is mounted on wheels or castors 7A so that the device may be removed from the race track and transported. Since the apparatus, when being moved, is pulled in the direction of its greatest length i. e. transversely of the stalls, the extensible and retractable rear end of the stalls is of great advantage in shortening the width of the apparatus for transportation purposes.

A single swinging door 7 is provided at the rear of each stall and double swinging doors 8 are provided at the front end of each stall. Each rear door 7 is hingedly connected to the vertical portion of one of the rods 4 by hinge members 4ª through which the rod 4 passes, and is provided with a double latch comprising two pivoted latch members 9 with a connecting rod 10 extending between them and pivotally connected at each end to one of the latch members. Keepers 11 are secured on the opposite rod 4 and are adapted to be engaged by the latch members 9. Mounted on the door 7 are straps 12 forming vertical guide slots through which the latch members 9 pass.

The front doors 8 are hingedly mounted on forward extensions 13 of the partition 3. Each door 8 is provided with two hinges 14. When the hinges are supported on common partitions between two stalls, the hinges interlock and pivot on a common pintle 15. The pintle 15 is secured to upper and lower lugs 13ᵇ secured to a vertical post 13ᵃ and extends through both the upper and lower pairs of hinges. On each pintle 15 are mounted two coil springs 16 the ends of which extend beneath lugs 17 on the doors. These springs are under tension and tend to open the doors to a position illustrated in dotted lines in Fig. 3. In the case of each end stall, one end of each spring extends beneath a lug 18 which is mounted on one of the upright posts 13ᵃ of the extension 13 of the frame 3.

The following means is provided for holding the doors in closed position and for simultaneously releasing them and permitting them to swing to the open position:

A bar 19 is pivotally connected to each door 8 between the inner and outer edges thereof adjacent the lower hinge through the medium of a link 20, which link is hingedly connected to the outer end of the bar 19 and hingedly connected to the door 8 by extending through slots 8ᵃ therein and by being bent around pins 8ᵇ which are secured to the outside of each door 8. The bar 19 is slidably supported on the frame by passing between the frame member 21 and post 34 and a rod 22 having a roller 23 thereon. On the inside of the bar 19 is provided a wedge shaped lug 24, the outward face of which is substantially at right angles to the bar and the rearward face of which slopes gradually to the bar.

The bars 19 of adjacent doors extend substantially parallel to one another and are comparatively closely spaced. Between each pair of bars 19 is a vertically movable rod 25 provided with a stop 26 extending on each side of the said rod 25 to engage the lugs 24 on the adjacent bars 19. When the door is closed, the sloping rearward side of the lug 24 engages the stop 26 forcing the resilient bar 19 slightly out to permit the lug to pass over the stop 26 and snap behind it. Each rod 25 passes through the lower horizontal frame member 13ᶜ and is vertically slidable thereon and extends upwardly to the overhead frame 2 and is pivotally connected to one of the arms 27ᵃ mounted on a rod 27 which extends the whole length of the upper framework of the apparatus and is rotatably mounted on bearings 28 at each end of the frame.

At one end of the apparatus steps 29 are provided for an operator to climb up to the top of the apparatus and a platform 30 is provided for the operator to stand on to open the doors. A handle 31 extends from the rotatable rod 27 at the end thereof adjacent the platform 30, which handle may be lifted by the operator to the position shown in dotted lines in Fig. 2, and thus raise the arms 27ᵃ and the rods 25, which in turn elevate the stops 26 to a position where they are out of engagement with the lugs 24, which releases the bars 19 and permits the doors 8 to swing outwardly under pressure of the springs 16.

To counterbalance the weight of the rods 25 and facilitate raising them, coil springs 25A may be provided extending between the rods 25 and the frame as shown in Fig. 2 and exerting an upward pull on the rods 25.

It will be observed that a bar 19' is connected to each door adjacent the upper hinge and that the construction of this bar is substantially the same as bar 19 described above. The rod 25 passes between each pair of bars 19 and 19' and is provided with two stops 26 and 26' at vertically spaced positions for simultaneously releasing each pair of adjacent bars when the rod 25 is raised. The construction herein described provides a double lock for the doors, and the bars 19 and 19' with the links 20 and 20' provides a double support for the doors as well as double locking means.

The links 20 and 20' and the bars 19 and 19' are both preferably formed of spring steel or other resilient metal so that when the doors are open they are not rigidly fixed in the open position but yield when pressure is applied transversely thereof as when a horse presses against them. This avoids the possibility of a horse injuring itself or its rider by running or falling against the doors as it leaves the stall.

In order to position the horses in the stalls and provide leg room for the rider, guards 32 are arranged longitudinally of each side of each stall, said guards being hinged to the partitions 3. As shown in Figs. 2 and 4, the guards 32 are hinged by means of apertured lugs 36 on rods 33 each of which extends from a vertical post 34 near the front of each stall to a vertical post 35 near the rear of the stall, the guards 32 of adjacent stalls being mounted on a common rod 33 which extends between them.

The rear end of each bar 19 is provided with two spaced apart cam faces 37 connected by a rod 37ᵃ which cams respectively engage the forward and rearward end of each guard 32, the cam faces 37 being so arranged that when the door to which the bar 19 is attached is closed, causing said bar and cam faces to move rearwardly, the cam faces raise the guards which they respectively engage. A spring 32ᵃ extends between the outer part of each guard 32 and part of the frame therebeneath, and tends to pull the guard downwardly when disengaged from the cam faces 37.

The upper bars 19' are each provided with a guide 46 on which is mounted rollers 46ᵃ and 46ᵇ between which the bars 19' pass; and to each upper bar 19' of each stall is connected a rod 39, see particularly Fig. 2, which rod extends through the frame member 35 or is slidably connected to and supported thereby. Connecting the ends of each pair of rods 39 adjacent the back of the stall is a breeching strap 40, which is preferably of rubber or other resilient material, and which is detachably connected by a hook 40ᵃ to at least one of the rods 39. It will be seen that when the bars 19' are moved forward by the opening of the doors 8, the rods 39 and the breeching straps 40 will be pulled forward. The breeching straps 40 are suitably located so that they will be just behind the thighs of the horses when they are properly positioned in the stall, and will touch the thighs of the horses when they are pulled forward, thus indicating that the door is open and that the race has begun.

For the purpose of making it possible to open any one gate without opening the other gates, a vertical rod 41 (shown in Fig. 4) is rotatably mounted on suitable parts of the frame extension 13. The rotatable mounting is effected by passing the upper and lower ends of the rod 41 through the upper and lower horizontal members of the frame extension 13 and providing collars 41ª to prevent vertical movement. The rod 41 is provided with a lower cam 42 and an upper cam 43 located between the lower and upper pairs of bars 19 and 19' respectively and adjacent the lugs 24 and stop 26 and lugs 24' and stop 26' respectively. Cords or wires 44 are connected to the ends of arms 43ª and extend outwardly and through holes in adjacent doors 8, the cords being crossed. When it is desired to open one of the doors without opening the other doors, one of the cords 44 is grasped by means of the ring 45 and is pulled to rotate the cams 42 and 43, which bear against the respective bars 19 and 19'. These bars are of sufficiently resilient metal that they may be pressed outwardly by the cams, causing the lugs 24 and 24' to disengage the stops 26 and 26' respectively, and thus release the bars and permit the door to which the bars are connected to swing open under the pressure of the springs 16. By pulling the other cord 44 the cams 42 and 43 will rotate in the opposite direction and release the adjacent door in the adjacent stall.

The device is used in the following manner. The doors 8 are normally open. When the race is about to start the horses are ridden to the starting apparatus and the rear doors of each stall are opened to admit them. The breeching strap 40 is disconnected at one end before or at the time the horses are put into the stalls. When each horse is in the stall, the breeching strap is connected and the rear door is closed. The front doors are then closed manually, and when closed are held in the closed position by the latch means already described. The closing of the front doors automatically raises the guards 32, thereby positioning the horse centrally of the stall.

When all the horses are in the stalls, the means for automatically opening the doors is operated by the starter, thus causing all the doors to swing outwardly, and at the same time dropping the guards 32 and giving a forward pull to the breeching strap 40. Connected with the door opening means may be a bell or other suitable signal. The opening of the doors and the forward pull on the breeching with or without the ringing of the bell indicate to the horses that the race has started, and the horses move forward. The fact that the doors swing outwardly from the partitions tends to separate the horses as they leave the stalls and prevents crowding. As will be seen in Fig. 3 the links 20 are arranged flat against the doors in their opened position and do not form any obstruction for the egress of the horses. Likewise the dropping of the guards 32 gives ample room for movement of the horses in leaving the stalls.

It will be understood that the interior of the stalls and the guards 32 are suitably padded to prevent injury to the horses. It will also be understood that when the horses have left the stalls and the race has commenced the starting apparatus may be pulled off the race track as is customary.

What I claim as my invention is:

1. In race starting apparatus, the combination of a frame forming a plurality of stalls; a pair of swing doors hingedly mounted on opposite sides of the front of each stall; spring means tending to cause the doors to swing outwardly; a rearwardly extending bar hingedly connected to each door between the inner and outer edges thereof and slidably supported by the frame, the bars of the doors of adjacent sides of adjacent stalls being arranged in substantially parallel relationship; a wedge-shaped lug on a side of each bar, the lugs on adjacent bars being arranged opposite one another; stops over which the wedge-shaped lugs are adapted to pass and engage when the doors are closed, a single stop being arranged between oppositely positioned lugs; and means for simultaneously raising all the stops to simultaneously release all the lugs and bars thus permitting the doors to swing open simultaneously.

2. In race starting apparatus, the combination of a frame forming a plurality of stalls; doors at the front of the stalls; spring means tending to open said doors; a restraining bar connected to each door and slidably supported on the frame; stops adapted to engage said restraining bars to restrain the doors from opening; means for simultaneously disengaging all the stops from said bars to permit the doors to open simultaneously; and means for independently disengaging each bar from its stop to permit each door to open independently.

3. In race starting apparatus, the combination of a frame forming a plurality of stalls; doors at the front of the stalls; spring means tending to open said doors; a restraining bar connected to each door and slidably supported on the frame; stops adapted to engage said restraining bars to restrain the doors from opening; means for simultaneously disengaging all the stops from said bars to permit the doors to open simultaneously; and means for independently disengaging each bar from its stop to permit each door to open independently, said means comprising cams operable to engage each bar and force it out of engagement with the stop.

4. In race starting apparatus, the combination of a frame forming a plurality of stalls; doors at the front of the stalls; spring means tending to open said doors; a resilient restraining bar connected to each door and slidably supported on the frame, the bars of adjacent doors being arranged substantially parallel and comparatively closely spaced; stops adapted to engage said restraining bars to restrain the doors from opening; means for simultaneously disengaging said stops and bars; and means for independently disengaging each bar from its stop, said means comprising a cam arranged between adjacent bars and means for turning the cam in one direction to engage one of the resilient bars and force the same out of engagement with the stop and in the other direction to engage the other adjacent resilient bar and force it out of engagement with the stop.

5. In race starting apparatus, the combination of a frame forming a plurality of stalls; doors at the front of the stalls; guards hingedly mounted one on each side of each stall; means for simultaneously opening the doors; and means for dropping the guards simultaneously with the opening of the doors.

6. In race starting apparatus, the combination of a frame forming a plurality of stalls; doors at the front of the stalls; spring means for causing the doors to swing outwardly; latches for retaining the doors closed; means for releasing the latches to permit the doors to swing open; guards hingedly mounted one on each side of each stall; and means for raising said guards when the doors are closed and lowering said guards when the doors are opened.

7. In race starting apparatus, the combination of a frame forming a plurality of stalls; doors at the front of the stalls; spring means for causing the doors to swing outwardly; latches for retaining the doors closed; means for releasing the latches to permit the doors to swing open; guards hingedly mounted one on each side of each stall; and means operable by the opening and closing of said doors for raising said guards when the doors are closed and lowering said guards when the doors are opened.

8. In race starting apparatus, the combination of a stall; a guard hingedly mounted on each side of the stall; a door hinged to each side of the front of the stall; and means for dropping the guards simultaneously with the opening of the doors and raising the guards, simultaneously with the closing of the doors.

9. In race starting apparatus, the combination of a stall; a guard hingedly mounted on each side of the stall; doors hinged to the front of the stall; and means for dropping the guards simultaneously with the opening of the doors and raising the guards simultaneously with the closing of the doors, said means including slidable cams operated by the closing of the doors to engage and lift the guards and by the opening of the doors to disengage the guards and permit them to drop.

10. In race starting apparatus, the combination of a stall; a guard hingedly mounted on each side of the stall; doors hinged to the front of the stall; and means for dropping the guards simultaneously with the opening of the doors and raising the guards, simultaneously with the closing of the doors, said means including bars connected to the doors between the inner and outer edge thereof and slidably supported by the frame, and cam faces on the bars adapted to engage the guards and raise them when the bars are pushed inwardly by the closing of the doors and to disengage the guards when the bars are pulled outwardly by the opening of the doors.

11. In race starting apparatus, the combination of a stall; a door hinged to the front of the stall; spring means tending to cause the door to open; a bar connected to the door and slidably mounted on the frame; a guard hingedly mounted on the side of the stall; a cam face on the bar adapted to disengage the guard when the bar moves forward when the door opens and engage the guard when the bar moves back when the door closes; and releasable latch means on the frame and bar to hold the bar in its retracted position.

12. In race starting apparatus, the combination of a frame forming a plurality of stalls; doors at the front of the stalls; a breeching strap adapted to extend across the rear of each stall; supports for the breeching, and means for moving the supports and breeching forward when the doors are opened.

13. In race starting apparatus, the combination of a frame forming a plurality of stalls; doors at the front of the stalls; a breeching strap adapted to extend across the rear of each stall; breeching supports; and means connecting the breeching supports to the doors whereby when the doors are opened the supports are moved forward simultaneously.

14. In a race starting apparatus, the combination of a frame forming a stall; a door hingedly mounted at each side of the front of the stall; a bar slidably supported on the frame and hingedly connected to each door between the inner and outer edges thereof and extending rearwardly thereof; a breeching strap extending across the rear of the stall; connecting means between the ends of the breeching and the bars; and means for opening the doors.

15. In a race starting apparatus, the combination of a frame forming a stall; a door hingedly mounted at each side of the front of the stall; a bar slidably supported on the frame and hingedly connected to each door between the inner and outer edges thereof and extending rearwardly thereof; a breeching strap extending across the rear of the stall; connecting means between the ends of the breeching and the bars; spring means tending to cause the doors to swing outwardly; latch means on the frame and the bars for retaining the bars in their retracted position and the doors closed; and means for simultaneously releasing the latch means.

16. In race starting apparatus, the combination of a frame forming a plurality of stalls; doors hingedly mounted on adjacent sides of the front of adjacent stalls; spring means tending to open said doors; a bar hingedly connected to each door and slidably supported by the frame, the said bars being arranged in close relationship; a shoulder on each adjacent bar arranged opposite one another; a stop adapted to engage the shoulders on adjacent bars and retain the doors in their closed position; and means for disengaging the stop from said shoulders to permit the doors mounted on adjacent sides of the stalls to open simultaneously.

17. In race starting apparatus, the combination of a frame forming a plurality of stalls; a pair of swing doors pivotally mounted on opposite sides of the front of each stall; spring means tending to cause the doors to swing outwardly; rearwardly extending bars hingedly connected to each door and slidably supported by the frame so that the outward swing of the doors will pull the bars forwardly, the bars on adjacent sides of adjacent stalls being in close relationship; a shoulder on the adjacent side of each adjacent bar, said shoulders being substantially opposite each other; a stop arranged between adjacent bars to engage said shoulders and hold said doors in their closed position; a stop arranged to engage the shoulder on each of the bars which are not adjacent to another bar; and means for disengaging all the stops from all the shoulders simultaneously to allow all the doors to open simultaneously.

18. In race starting apparatus, the combination of a frame forming a plurality of stalls; a pair of swing doors pivotally mounted on opposite sides of the front of each stall; spring means tending to cause the doors to swing outwardly; rearwardly extending bars slidably supported by the frame, the bars of the doors on the adjacent sides of adjacent stalls being arranged in close relationship; a link for connecting each bar to one of the doors, said link being hinged to an end of the bar and to the door between the inner and outer edges thereof, a shoulder on each bar, the shoulders on adjacent bars being arranged opposite one another; a single stop adapted to engage the shoulders on adjacent bars and retain the doors in their closed position; a stop arranged to engage the shoulder on each of the bars which are not adjacent to another bar; and means for simultaneously disengaging all the said stops from said shoulders to permit the doors to open simultaneously.

19. In race starting apparatus, the combination of a frame forming a plurality of stalls; a pair of swing doors pivotally mounted on opposite sides of the front of each stall; spring means tending to cause the doors to swing outwardly; rearwardly extending resilient bars slidably supported by the frame; links for connecting the bars to the doors, each link being hinged to one of the bars and to one of the doors, said bars being adapted to slide inwardly when the doors are closed, and outwardly when the doors are opened; means for retaining the bars in the inward position; and means for releasing the bars to allow the doors to open, the said links and resilient bars forming a yielding stop for said doors.

20. In race starting apparatus, the combination of a frame forming a plurality of stalls; a pair of swing doors pivotally mounted on opposite sides of the front of each stall; spring means tending to cause the doors to swing outwardly; rearwardly extending bars slidably supported by the frame; resilient links for connecting the bars to the doors, each link being hinged to one of the bars and to one of the doors, said bars being adapted to slide inwardly when the doors are closed, and outwardly when the doors are opened; means for retaining the bars in the inward position; and means for releasing the bars to allow the doors to open, the said bars and resilient links forming a yielding stop for said doors.

MARCUS RAY COWELL.